United States Patent
Zhang

(10) Patent No.: US 12,501,145 B2
(45) Date of Patent: Dec. 16, 2025

(54) PHOTOGRAPHING DEVICE WITH DOUBLE TOUCH SCREENS ON DIFFERENT SIDES AND CONTROL METHOD THEREOF, AND STORAGE MEDIUM

(71) Applicant: SZ DJI TECHNOLOGY CO., LTD., Guangdong (CN)

(72) Inventor: Ge Zhang, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 133 days.

(21) Appl. No.: 18/381,180

(22) Filed: Oct. 18, 2023

(65) Prior Publication Data

US 2024/0048840 A1    Feb. 8, 2024

Related U.S. Application Data

(63) Continuation of application No. PCT/CN2021/088197, filed on Apr. 19, 2021.

(51) Int. Cl.
*H04N 23/63*    (2023.01)
*H04N 23/667*    (2023.01)

(52) U.S. Cl.
CPC ......... *H04N 23/632* (2023.01); *H04N 23/633* (2023.01); *H04N 23/667* (2023.01)

(58) Field of Classification Search
CPC .. H04N 23/631; H04N 23/632; H04N 23/633; H04N 23/667; H04N 23/53; H04N 23/62; H04N 23/50
See application file for complete search history.

(56) References Cited

U.S. PATENT DOCUMENTS

| | | | |
|---|---|---|---|
| 9,606,723 B2 * | 3/2017 | Selim | H04M 1/0214 |
| 2009/0278817 A1 | 11/2009 | Tai | |
| 2014/0192244 A1 * | 7/2014 | Ishihara | G06F 3/0488 |
| | | | 348/333.02 |

FOREIGN PATENT DOCUMENTS

| | | |
|---|---|---|
| CN | 102981562 A | 3/2013 |
| CN | 105141852 A | 12/2015 |
| CN | 109862172 A | 6/2019 |
| CN | 109889630 A | 6/2019 |
| CN | 209070650 U | 7/2019 |
| CN | 112154643 A | 12/2020 |

OTHER PUBLICATIONS

International Search Report and Written Opinion mailed on Jan. 10, 2022, received for PCT Application PCT/CN2021/088197, filed on Apr. 19, 2021, 9 pages including English Translation.

\* cited by examiner

*Primary Examiner* — Kelly L Jerabek
(74) *Attorney, Agent, or Firm* — ANOVA LAW GROUP, PLLC

(57) ABSTRACT

A method of controlling a photographing device may include Obtaining setting operation from a user on a first touch screen or a second touch screen of a photographing device, the first touch screen being set on a lens side of the photographing device and a second touch screen being set on an opposite side of the lens side of the photographing device; displaying a first setting interface on the first touch screen and/or displaying a second setting interface on the second touch screen in accordance with the setting operation; and obtaining a setting parameter set by the user based on the first setting interface or the second setting interface, and applying the setting parameter to both the first touch screen and the second touch screen.

20 Claims, 10 Drawing Sheets

PHOTOGRAPHING DEVICE WITH DOUBLE TOUCH SCREENS ON DIFFERENT SIDES AND CONTROL METHOD THEREOF, AND STORAGE MEDIUM

CROSS-REFERENCE TO RELATED APPLICATION

The present application is a continuation of International Application No. PCT/CN2021/088197, filed Apr. 19, 2021, the entire contents of which being incorporated herein by reference in its entirety.

TECHNICAL FIELD

The present disclosure relates to the field of photographing technology, and in particular to a photographing device, a control method of the photographing device, and a storage medium.

BACKGROUND

With the rise of short videos, the photographing equipment has also been well developed, such as sports cameras.

SUMMARY

Based on this, the present disclosure provides a method of controlling a photographing device, a photographing device, and a storage medium to improve a user's photographing experience.

In a first aspect, the present disclosure provides a method of controlling a photographing device. The method of controlling a photographing device may include obtaining setting operation from a user on a first touch screen or a second touch screen of a photographing device, the first touch screen being set on a first side of the photographing device where a lens is disposed and a second touch screen being on a second side of the photographing device opposite to the first side of the photographing device; displaying a first setting interface on the first touch screen and/or displaying a second setting interface on the second touch screen in accordance with the setting operation; and obtaining a setting parameter set by the user based on the first setting interface or the second setting interface, and applying the setting parameter to both the first touch screen and the second touch screen.

In a second aspect, the present disclosure also provides a photographing device. The photographing device, comprising a processor and a memory;
the memory stores a computer program;
the processor is configured to, in executing the computer program:
 obtain setting operation from a user on a first touch screen or a second touch screen of a photographing device, the first touch screen being set on a first side of the photographing device where a lens is disposed and a second touch screen being on a second side of the photographing device opposite to the first side of the photographing device; display a first setting interface on the first touch screen and/or displaying a second setting interface on the second touch screen in accordance with the setting operation; and
 obtain a setting parameter set by the user based on the first setting interface or the second setting interface, and apply the setting parameter to both the first touch screen and the second touch screen.

In a third aspect, the present disclosure further provides a computer-readable storage medium, said computer-readable storage medium storing a computer program, said computer program when executed by a processor causing said processor to implement a control method as described in any one of the claims provided herein.

Embodiments of the present disclosure provide a control method of a photographing device, a photographing device and a storage medium, wherein the photographing device comprises a first touch screen and a second touch screen, the first touch screen is set on the lens side of the photographing device, and the second touch screen is set on the opposite side of the lens of the photographing device, and by executing the control method of the photographing device provided by some embodiments of the present disclosure, the trouble of the user switching the screen frequently to repeat the parameter setting can be solved and at the same time facilitates the operation of the user, which in turn improves the user's experience.

It should be understood that the above general description and the detailed description that follows are exemplary and explanatory only and do not limit the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1A:
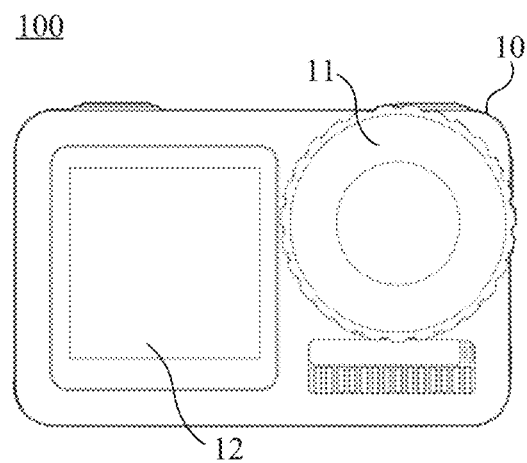
FIGS. 1a and 1b are schematic diagrams of a structure of a photographing device provided by some embodiments of the present disclosure.

The technical solutions in the embodiments of the present disclosure will be described below in conjunction with the accompanying drawings in the embodiments of the present disclosure. Obviously, the described embodiments are only some of the embodiments of the present disclosure, not all of them. Based on the embodiments in this application, all other embodiments obtained by persons of ordinary skill in the art without making creative efforts belong to the scope of protection of this application.

It should be also understood that the terminology used herein in this application specification is used solely for the purpose of describing particular embodiments and is not intended to limit this application. As used in this application specification and in the appended claims, the singular forms "one," "a," and "the" are intended to include the plural form unless the context clearly indicates otherwise.

It should be further understood that the term "and/or" as used in this application specification and the appended claims refers to any combination and all possible combinations of one or more of the items listed in association, and includes such combinations.

The flowchart shown in the accompanying drawings is only an exemplar illustration and is not necessary to include all contents and operations/steps, nor is it necessary to perform them in the order depicted. For example, some of the operations/steps may also be decomposed, combined or partially merged, and thus the actual order of execution may change depending on the actual situation.

With people's pursuit of outdoor photography, especially the pursuit of stable picture quality during sports, cameras for sports, namely sport cameras, have appeared in the market. However, most of the current sport cameras have a single-screen design. That is, the sport camera is only set up with one display screen, which is used for displaying the photographing interface or the viewfinder. Of course, there are also sport cameras having two display screens. This sport camera includes a front side and a rear side. The front side is the side with a lens, and the rear side is the side opposite to the front side. The display screen set up in the front side of the sport camera is called the front screen (located in the lens side of the camera) and the display screen set up in the rear side of the sport camera is called the rear screen. However, the front screen of the current sport camera is a black and white screen and is only used for framing display, which is not conducive to the user's setting of photographing parameters or photographing operations, and thus does not provide the user with a better photographing experience.

Some embodiments of the present disclosure provide a control method of a photographing device, a photographing device, and a storage medium, wherein the photographing device comprises a first touch screen (a front screen) and a second touch screen (a rear screen), and a control method is provided based on the photographing device to facilitate a user's control of the photographing device to improve the user's photographing experience.

Figure 1B:
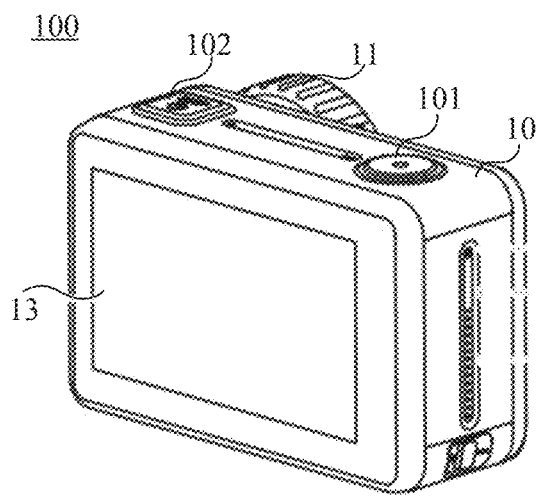

Reference is made to FIGS. 1a and 1b, which illustrate a structure of a photographing device 100 provided by some embodiments of the present disclosure. As shown in FIGS. 1a and 1b, the photographing device 100 includes a device body 10, a lens 11, a first touch screen 12 and a second touch screen 13.

In one embodiment, the lens 11, the first touch screen 12, and the second touch screen 13 are provided on the device body 10, the first touch screen 12 is provided on the lens side of the of the photographing device 100, which is the first side of the photographing device where the lens is disposed and the second touch screen 13 is provided on the opposite side of the lens side of the photographing device 100, which is the second side of the photographing device opposite to the first side of the photographing device.

In the photographing device 100 according to some embodiments of the present disclosure, the first touch screen 12 may be referred to as a front screen and the second touch screen 13 may be referred to as a rear screen. Among other things, the first touch screen 12 and the second touch screen 13 may be used to accomplish different shots, such as the first touch screen 12 is used to accomplish a selfie, and the second touch screen 13 is used to take a picture of a landscape or another user.

In an embodiment of the present disclosure, the photographing device 100 includes a photographing button 101 and a power button 102 provided on the device body 10, the photographing button 101 is used to trigger the photographing of an image, and the power button 102 is used to turn on or off the photographing device 100.

In the photographing device 100 provided in some embodiments of the present disclosure, in addition to photographing and switching on/off, other operations or parameter settings, such as setting photographing parameters, are realized by setting through the touch screen, which can be specifically done through the first touch screen 12 or the second touch screen 13.

In some embodiments, the size of the first touch screen 12 is smaller than the size of the second touch screen 13, but the two touch screens may display the same graphical user interface and the display modes may be different.

Figure 2:
FIG. 2 is a schematic diagram of an effect of a photographing interface provided by an embodiment of the present disclosure.

Exemplarily, both the first touch screen 12 and the second touch screen 13 can display a photographing interface 20, the photographing interface 20 is specifically shown in FIG. 2. The photographing interface 20 includes a plurality of different control icons, and the different control icons realize different functions. For example, the control icons include a return to home page icon 21, a photographing icon 22, and a playback icon 23. The return to home page icon 21 is used to trigger returning to the home page, the photographing icon 22 is used to trigger photographing the image, and the playback icon 23 is used to trigger playing back the shot video.

In addition to the ways of physical buttons and icon operation, the first touch screen 12 and the second touch screen 13 in the photographing device 100 provided by some embodiments of the present disclosure may also respond differently according to different touch operations of the user to realize different functions.

Exemplarily, the different touch operations may include at least one or more of: single-finger sliding down, single-finger sliding up, single-finger sliding right, single-finger sliding left, single-finger sliding up and down, single-finger long press, two-finger double tap, and two-finger sliding left and right.

Exemplary, the different touch operations include single finger sliding down to open a system setting interface, single finger sliding up to open a parameter switching interface, single finger sliding right to open a video playback interface, single finger sliding left to open an image setting interface, single finger sliding up and down slide to open a brightness adjustment interface, single finger long press to open a metering mode interface, two-finger double tap to open a front and rear screen switching interface, and two-finger sliding left and right to open a photographing mode switching interface and so on.

Hereinafter, a control method of a photographing device provided by an embodiment of the present disclosure will be described in detail in connection with the photographing device in FIG. 1a and FIG. 1b. It is to be noted that the photographing devices illustrated in FIGS. 1a and 1b are used only for explaining the control method of the present disclosure.

Figure 3:
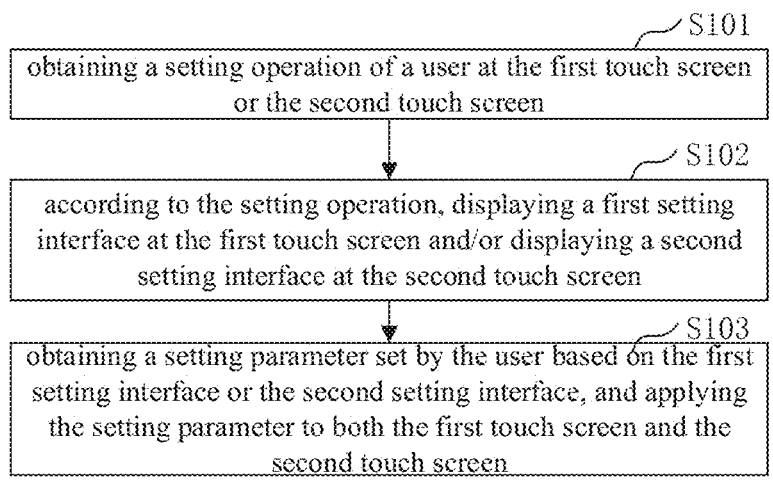
FIG. 3 is a flow diagram of a control method of a photographing device provided by an embodiment of the present disclosure.

Referring to FIG. 3, FIG. 3 is a schematic flowchart of a control method of a photographing device provided by some embodiments of the present disclosure. The control method of the photographing device is applied to the photographing device to facilitate the user's photographing operation, thereby improving the user's photographing experience.

As shown in FIG. 3, the method of controlling the photographing device according to one embodiment of the present disclosure includes steps S101 to S103.

S101, obtaining a setting operation of a user at the first touch screen or the second touch screen;

S102, according to the setting operation, displaying a first setting interface at the first touch screen and/or displaying a second setting interface at the second touch screen; and S103, obtaining a setting parameter set by the user based on the first setting interface or the second setting interface, and applying the setting parameter to both the first touch screen and the second touch screen.

In one embodiment, when the user uses the photographing device 100, the photographing device 100 may be triggered to light up the first touch screen 12 or the second touch screen 13. For example, in the power-on state, the user touches the first touch screen 12, then the first touch screen 12 is displayed, or the user touches the second touch screen 13, then the second touch screen 13 is displayed, and obtains a setting operation of the user on the first touch screen 12 or the second touch screen 13. The setting operation is used to set a parameter of the photographing device, such as setting a photographing parameter.

The setting operation may include a plurality of different touch operations, the plurality of different touch operations correspond to different setting interfaces, and the different setting interfaces are used to set different parameters.

In an embodiment of the present disclosure, the touch operation may include at least one of: single-finger sliding down, single-finger sliding up, single-finger sliding right, single-finger sliding left, single-finger sliding up and down, single-finger long-press, two-finger double tap, and two-finger sliding left and right. The setting interface may include at least one of: a system setting interface, a mode parameter switching interface, a video playback interface, an image setting interface, a brightness adjustment interface, a metering mode interface, a front and rear screen switching interface, and a photographing mode switching interface.

In one embodiment, the first setting interface and the second setting interface may be any one of a system setting interface, a mode parameter switching interface, a video playback interface, an image setting interface, a brightness adjustment interface, a metering mode interface, a front and rear screen switching interface, and a photographing mode switching interface.

In some embodiments, the mode parameter switching interface includes a mode switching interface and a parameter switching interface under the mode switching interface; wherein the mode switching interface includes at least one of a photo taking mode, a video photographing mode, or a slow motion mode, and the parameter switching interface includes at least one of a resolution setting interface or a frame rate setting interface.

In one embodiment, according to the setting operation, the first setting interface is displayed on the first touch screen 12 or the second setting interface is displayed on the second touch screen 13, or the second setting interface is displayed on the first touch screen 12 and the first setting interface is displayed on the second touch screen 13, depending on the setting operation of the user.

In some embodiments, the first setting interface displays the same interface content as the second setting interface. Among other things, the interface content of the first setting interface is displayed in a different mode than the interface content of the second setting interface.

Exemplarily, the display mode includes one of a lattice display, a page-flipping display, a full-screen display, a split-screen display, and a floating window display. For example, the display mode corresponding to the first setting interface may be a lattice display, and the display mode corresponding to the second setting interface may be a page flip display.

In some embodiments, both the first setting interface and the second setting interface include a plurality of setting icons, and different setting icons are used to set different parameters so that the user can set different setting parameters by operating different setting icons.

In some embodiments, the size of the first touch screen is smaller than the size of the second touch screen, and the first touch screen displays the setting icons of the setting interface by means of page-flipping so that the user can set different setting parameters by means of flipping pages to use different setting icons.

In some embodiments, according to the setting operation, when the first touch screen 12 displays the first setting interface and the second touch screen 13 displays the second setting interface, the interface contents of the first setting interface and the second setting interface are set to be partially the same or exactly the same to facilitate user operation. However, since the sizes of the first touch screen 12 and the second touch screen 13 are different, it is necessary that the display methods or display modes of the first touch screen 12 and the second touch screen 13 are also different. For example, according to the proportion of the size of the first touch screen 12 and the second touch screen 13, the interface content of the first setting interface is scaled up in equal proportions so as to be displayed in the second touch screen 13 or the interface content of the second setting interface is scaled down in equal proportions so as to be displayed in the first touch screen 12. Further, for example, the interface content of the second setting interface may be displayed in the first touch screen 12 in a page-flipping mode.

Figure 5A:
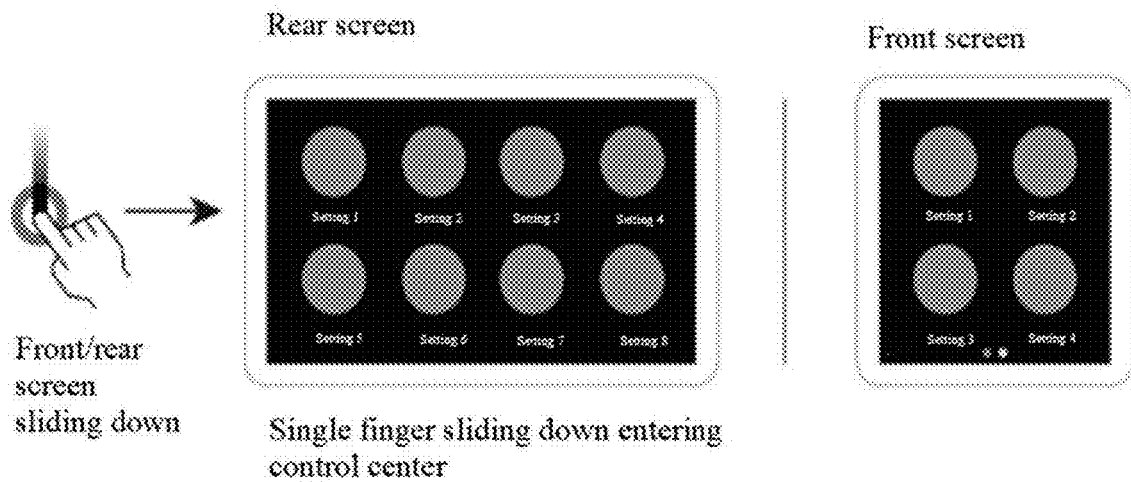
FIGS. 5a to 5h are schematic diagrams of different touch operations corresponding to different setting interfaces provided by some embodiments of the present disclosure.

Exemplarily, as shown in FIG. 5a, the setting icons in the second setting interface displayed in the second touch screen 13 (rear screen) are displayed in the first touch screen 12 (front screen) in a paged manner. It is to be noted that the first touch screen 12 displays the setting icons in a paged manner. That is, according to the user's operation on the second touch screen 13, the setting icons that the user need to operate are determined, and the target page that needs to be displayed on the first touch screen is determined based on the setting icons that the user needs to operate and the target page is displayed on the first touch screen 12. This can further facilitate user operations and improve user experience.

Exemplarily, as shown in FIG. 5a, for example, if the user clicks on the setting icon 4 (Setting 4) in the second touch screen 13 (rear screen), the tab where the setting icon 4 is located is determined to be the target tab, and the target tab is automatically displayed in the first touch screen 12. This facilitates the user to quickly set the same parameter on both the front and rear screens without having to search for them, thereby improving the user experience.

After obtaining the setting parameter set by the user based on the first setting interface or the second setting interface, the setting parameter is applied to both the first touch screen and the second touch screen. Thereby, it is convenient for the user to set the parameter of the photographing device using whichever display screen is used, without having to repeatedly switch between the screens of the photographing device, thereby improving the photographing experience of the user.

For example, the user sets an exposure parameter on the first setting interface, and the second setting interface also applies the exposure parameter, i.e., the second setting interface also displays the exposure parameter when the second touch screen displays the second setting interface.

As another example, if the user sets the resolution and frame rate of the captured video on the second setting interface, the first setting interface also displays the resolution and frame rate when the first touch screen displays the first setting interface.

Figure 4:
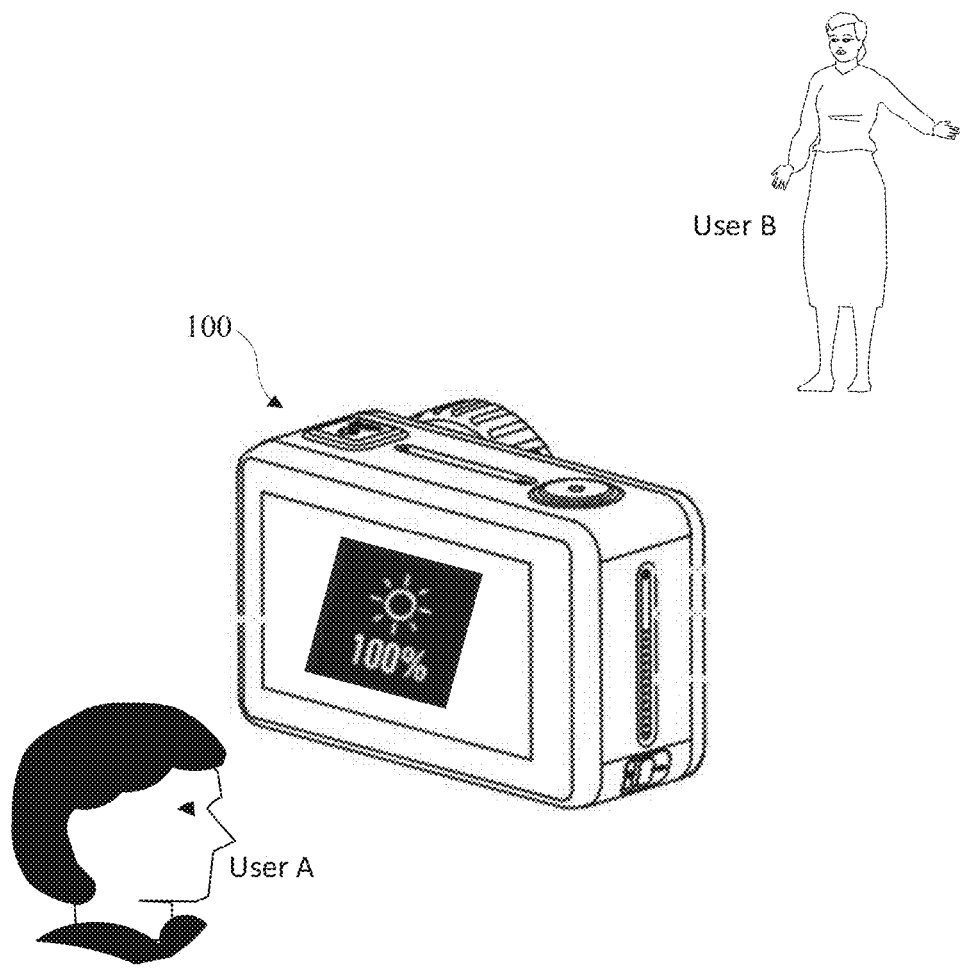
FIG. 4 is a schematic diagram of a scene for setting a parameter of a photographing device provided by some embodiments of the present disclosure.

In a scenario, when a user takes a picture of another user, as shown in FIG. 4, specifically when user A takes a picture of user B using the photographing device 100, a first setting interface is displayed on the first touch screen 12 and a second setting interface is displayed on the second touch screen 13. User A displays a setting parameter set in the first setting interface on the first touch screen 12. Since the second setting interface is also displayed on the second touch screen 13 and the second touch screen applies the setting parameter, user B can know the setting process and the setting parameter of user A through the second touch screen 13. If at this time the user B wants to modify the setting parameter, he or she can inform the user A in making a reset, thereby improving the experience of the user being photographed.

In one embodiment, the setting parameter set by the user based on the first setting interface or the second setting interface is obtained, and the setting parameter is applied to both the first touch screen and the second touch screen. Specifically, the setting parameter set by the user based on the first setting interface or the setting parameter set in the second setting interface can be obtained. The setting process corresponding to the setting parameter and/or the corresponding setting parameter are displayed in the second setting interface or the first setting interface for user confirmation; and according to the user's confirmation instruction, the setting parameter is saved in both the first setting interface and the second setting interface, so that both the first touch screen and the second touch screen apply the setting parameter.

It is to be noted that in one embodiment of the present disclosure, it may be that the setting parameter and the setting process set based on the first setting interface displayed on the first touch screen 12 are displayed through the second setting interface displayed on the second touch screen 13. The second touch screen displaying the setting parameter set at the first touch screen can facilitate a plurality of users to know which parameter has been set, which in turn can improve experience of the plurality of users using the photographing device.

In some embodiments, the first setting interface and the second setting interface include a parameter confirmation icon, and when a confirmation operation of the parameter confirmation icon by the user is acquired, a confirmation instruction of the user is obtained, and the setting parameter is saved in both the first setting interface and the second setting interface.

In some embodiments, a user's operation on the first touch screen or the second touch screen may also be obtained, and whether the user's operation is a predetermined confirmation operation is determined. If the user's operation is a predetermined confirmation operation, it is determined that a confirmation instruction from the user has been obtained.

Exemplarily, it is predetermined that the confirmation operation is a double-tap operation, and if the user's operation on the first touch screen or the second touch screen is also a double-tap operation, it is determined that a confirmation instruction from the user is obtained.

In one embodiment of the present disclosure, in order to facilitate the user to set parameters, different touch operations are defined to correspond to different setting interfaces. Specifically: single-finger sliding down corresponds to the system setting interface; and/or, single-finger sliding up corresponds to the mode parameter switching interface; and/or, single-finger sliding right corresponds to the video playback interface; and/or, single-finger sliding left corresponds to the image setting interface; and/or, single-finger sliding up and down corresponds to the brightness adjustment interface; and/or, single-finger long press corresponds to the metering mode interface; and/or, two-finger double tap corresponds to the front-and-back screen switching interface; and/or, two-finger swipe left and right corresponds to the photographing mode switching interface.

Exemplarily, as shown in FIG. 5a, a single-finger sliding down is defined to correspond to a system setting interface. The single-finger sliding down means that if a user performs a single-finger press on the screen and swipe down on the first touch screen 12 or the second touch screen 13, then a system setting interface is displayed on the first touch screen 12 and/or the second touch screen 13, which includes a plurality of system setting icons, such as Settings 1 to Settings 8 in FIG. 5a. Different system setting icons are used to set different setting parameters.

It is to be noted that when the user performs a single-finger sliding down operation on the second touch screen 13 (rear screen), and of course also on the first touch screen 12 (front screen), a system setting interface is displayed on the second touch screen 13 (rear screen), and at the same time, such system setting interface is also displayed on the first touch screen 12 (front screen). A setting parameter set by the user in the first setting interface or in the second setting interface is obtained, and the setting parameter is applied to both the first touch screen and the second touch screen. Therefore, no matter whether the user wants to take a selfie or wants to take a picture of a distant landscape at this time, if the user needs to set the parameter, he or she can set the parameter without switching the screen, which improves the user's convenience and experience in using the photographing.

Figure 5B:
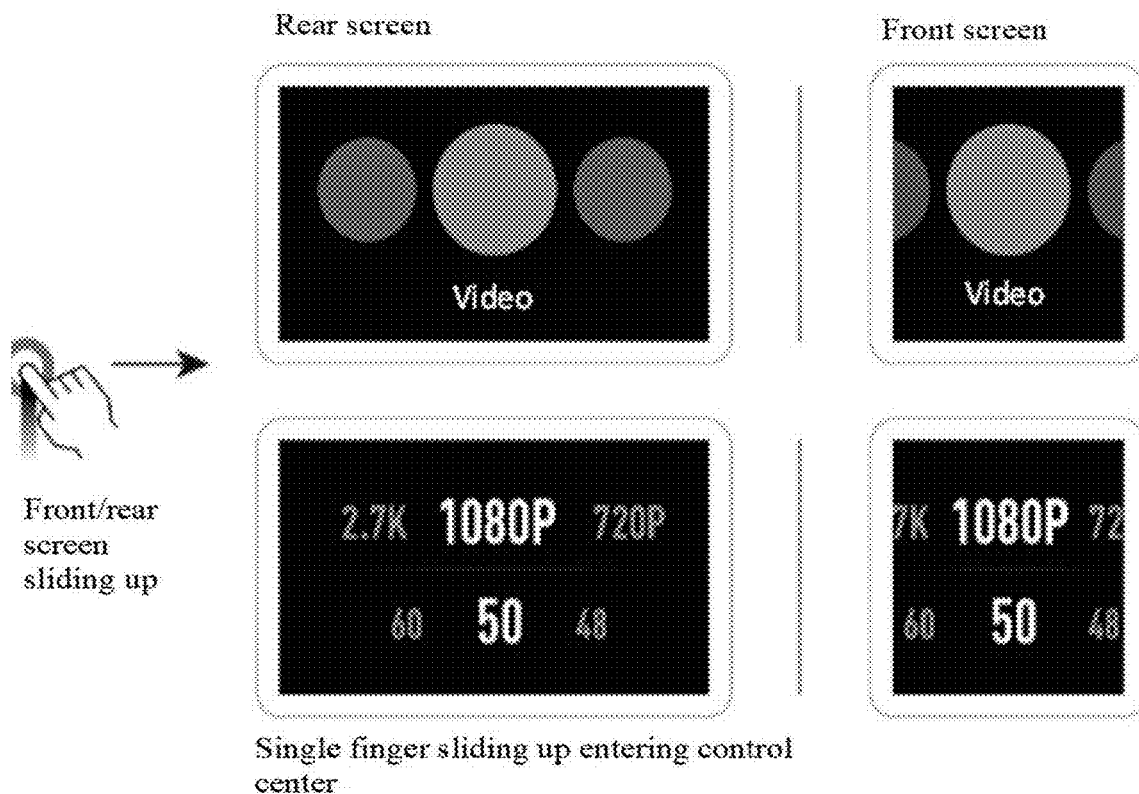

Exemplarily, as shown in FIG. 5b, a single-finger sliding up is defined to correspond to a mode parameter switching interface, and the single-finger sliding up means that if the user performs a single-finger press on the screen and slides upward on the first touch screen 12 or the second touch screen 13, then a mode parameter switching interface is displayed on the first touch screen 12 and/or the second touch screen 13, as shown in FIG. 5b. The mode parameter switching interface comprises a mode switching interface (FIG. 5b upper) and a parameter switching interface (FIG. 5b lower), wherein the resolution and frame rate of the video photographing can be set through the parameter switching interface. For example, the resolution is set to be 1080 P and the frame rate is set to be 50 Hz.

Figure 5C:
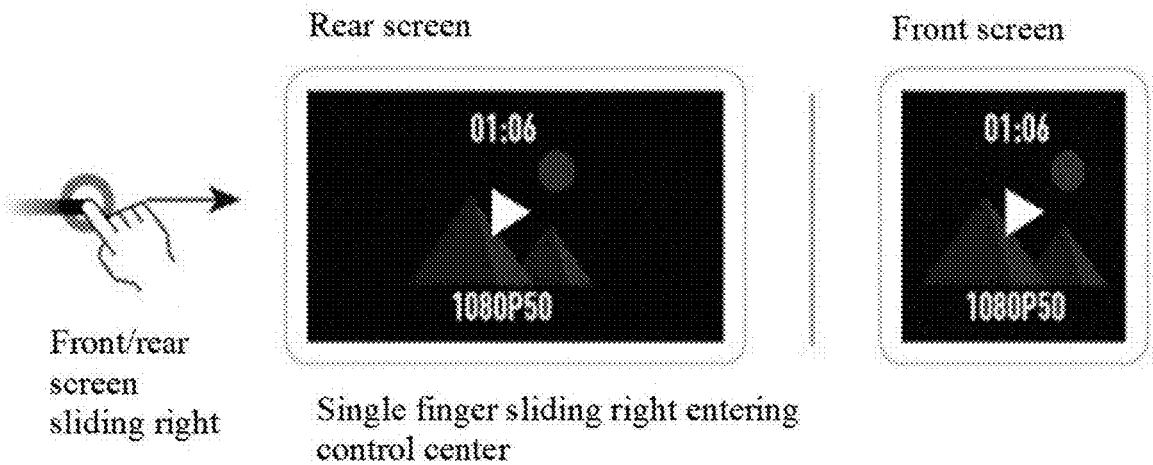

Exemplarily, as shown in FIG. 5c, a single-finger sliding right is defined to correspond to a video playback interface, and a single-finger sliding right means that if the user performs a single-finger press on the screen and swipes to the right on either the first touch screen 12 or the second touch screen 13, then a mode video playback interface is displayed on either the first touch screen 12 and/or the second touch screen 13 for playing back the captured video.

Figure 5D:
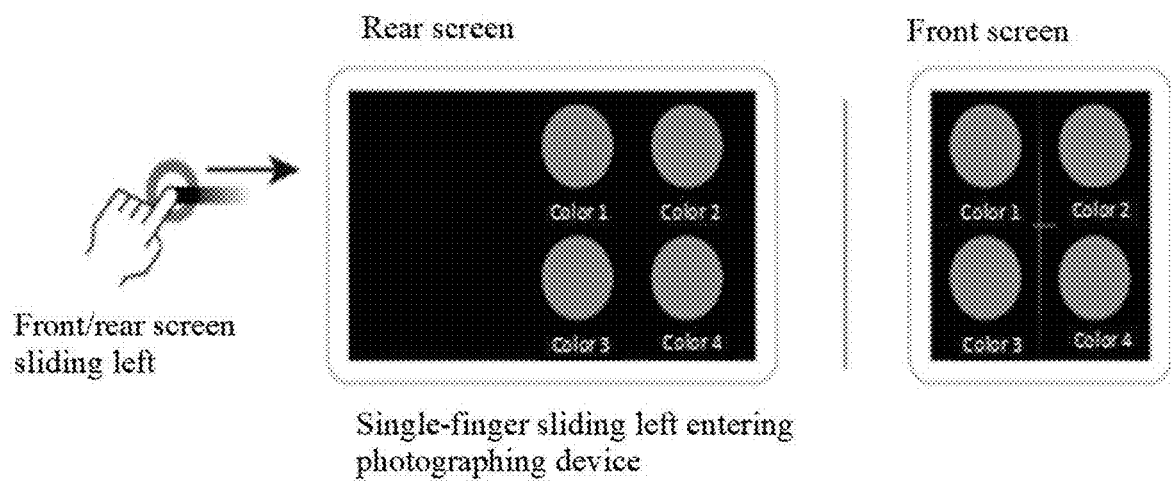

Exemplarily, as shown in FIG. 5d, a single-finger sliding left is defined to correspond to an image setting interface, and a single-finger sliding left means that if a user performs a single-finger press on the screen and swipes to the left on the first touch screen 12 or the second touch screen 13, a mode image setting interface is displayed on the first touch screen 12 and/or the second touch screen 13 for setting the color or tone of an image, etc.

Figure 5E:
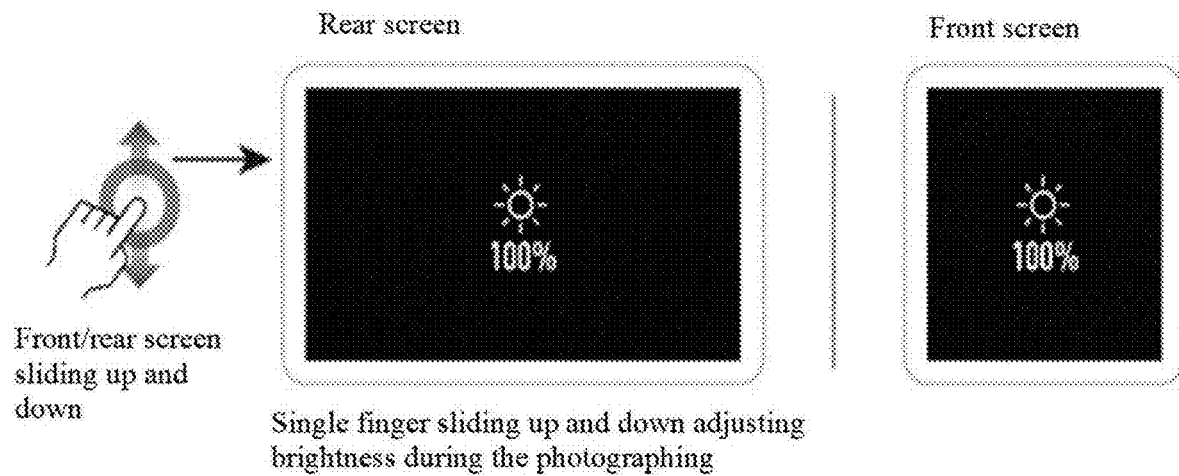

Exemplarily, as shown in FIG. 5e, a single-finger sliding up and down is defined to correspond to a brightness adjustment interface, and the single-finger sliding up and down means that if the user performs a single-finger press on the screen and swipes up and down on the first touch screen 12 or the second touch screen 13, a brightness adjustment interface is displayed on the first touch screen 12 and/or the second touch screen 13 for adjusting the brightness.

Figure 5F:
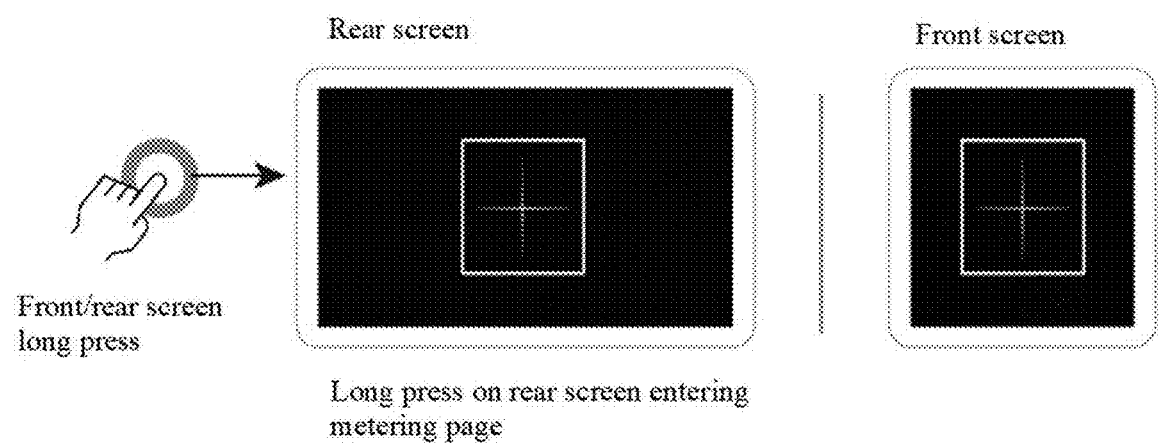

Exemplarily, as shown in FIG. 5f, a single-finger long press is defined to correspond to a metering mode interface, and a single-finger long press means that if the user performs a single-finger press of the screen and exceeds a preset length of time, for example, more than 1 second or 2 seconds, on the first touch screen 12 or second touch screen 13, a metering mode interface is displayed on the first touch screen 12 and/or the second touch screen 13 for performing metering.

Figure 5G:
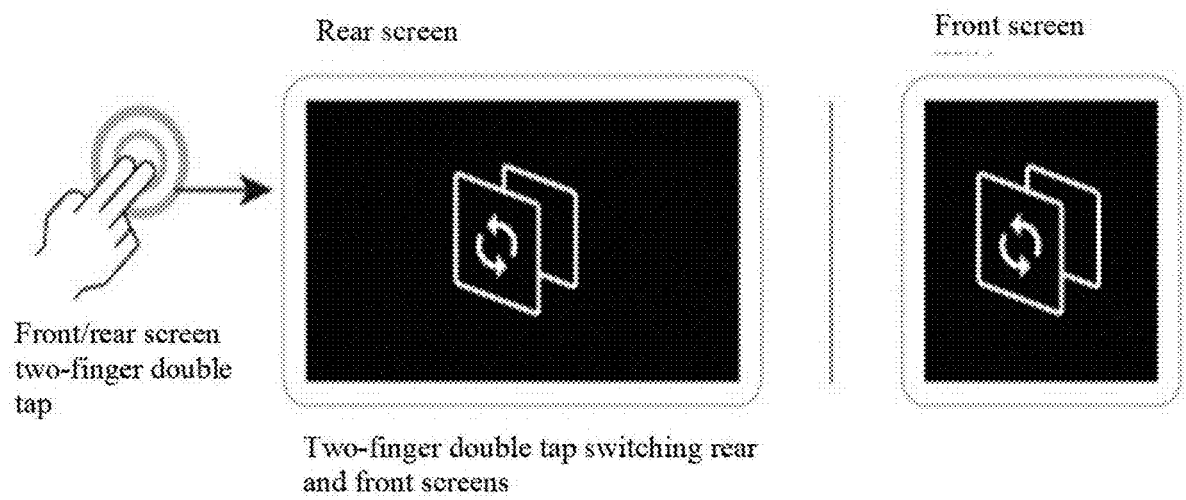

Exemplarily, as shown in FIG. 5g, a two-finger double tap is defined to correspond to a front and back screen switching interface, and the two-finger double tap means that when a user performs a double-tap operation on the first touch screen 12 or the second touch screen 13 with two fingers, the front and back screen switching interface is displayed on the first touch screen 12 and/or the second touch screen 13, wherein the front and back screen switching interface includes a front and back screen switching icon. When a user is detected operating the front and back screen switching icon, the display contents of the front screen and the back screen are switched, which is convenient for the user to view.

Figure 5H:
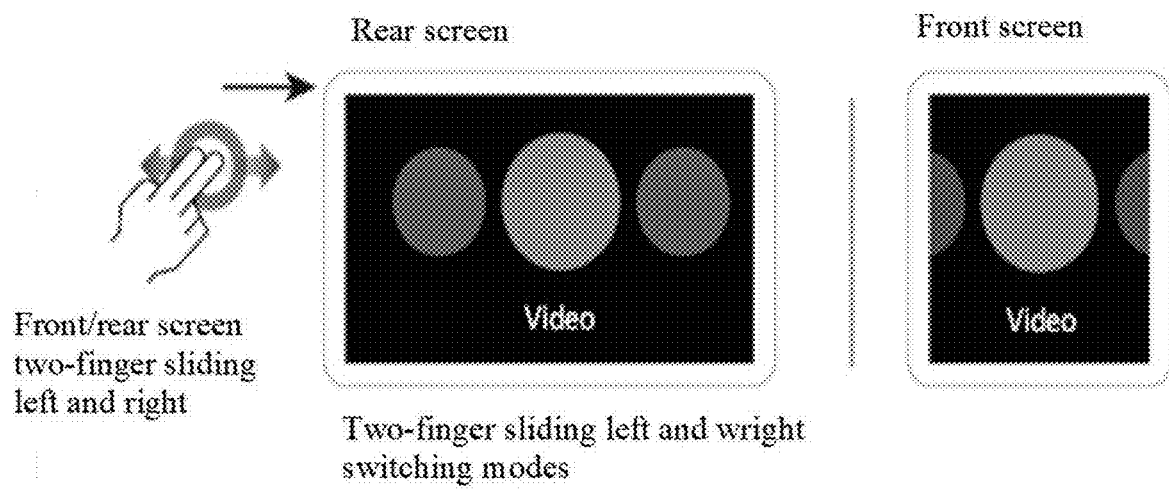

Exemplarily, as shown in FIG. 5h, a two-finger sliding left and right is defined to correspond to a photographing mode switching interface, and the two-finger sliding left and right means that if the user presses the first touch screen 12 or the second touch screen 13 with two fingers and swipes left and right, a photographing mode switching interface is displayed on the first touch screen 12 and/or the second touch screen 13 for photographing according to different photographing modes, for example, photographing a video or a picture.

In some embodiments, in order to improve operability and experience of the user, it is also possible to obtain a touch operation customized by the user, obtain a setting interface selected by the user for the customized touch operation, and to establish an association relationship between the customized touch operation and the setting interface selected and save it, thereby facilitating the user of opening the corresponding setting interface with the touch operation defined by the user.

Exemplarily, if the user has customized the single-finger sliding left and right corresponding to the image setting interface, the correspondence between the single-finger sliding left and right and the image setting interface is saved. When the user's operation at the first touch screen 12 or the second touch screen 13 is detected to be a single-finger sliding left and right operation, the image setting interface is displayed at the first touch screen 12 and/or the second touch screen 13.

Figure 6A:
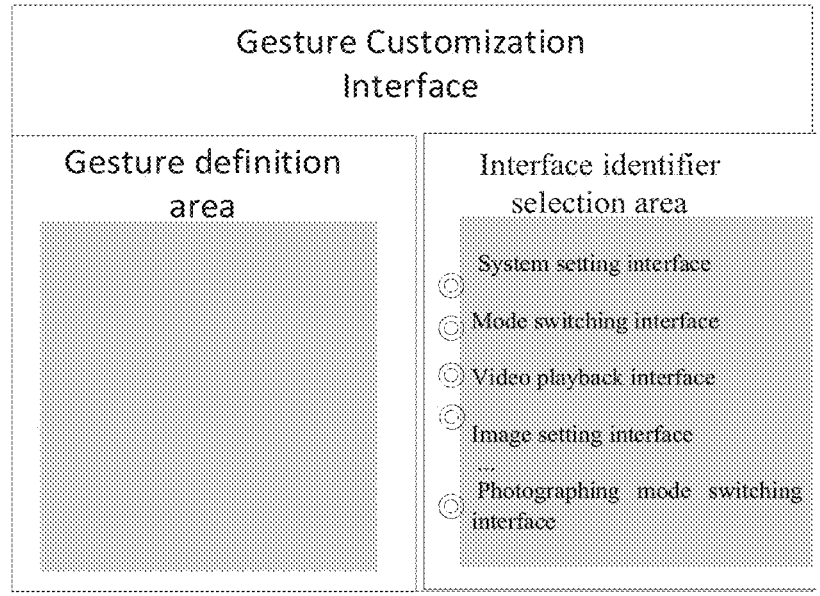
FIGS. 6a and 6b are schematic diagrams of a gesture customization interface provided by some embodiments of the present disclosure.

In some embodiments, there is also provided a gesture customization interface, specifically shown in FIG. 6a, wherein the gesture customization interface includes a gesture definition area and a plurality of interface identifiers of the setting interfaces for selection. When a user customizes a touch operation, the gesture customization interface is displayed for the user to customize the touch operation and select the interface identifier of the setting interface, and the interface identifier of the setting interface selected by the user is established in correspondence with the touch operation customized by the user so as to trigger the display of the corresponding setting interface on the first touch screen 12 or the second touch screen 13 by the touch operation.

Figure 6B:
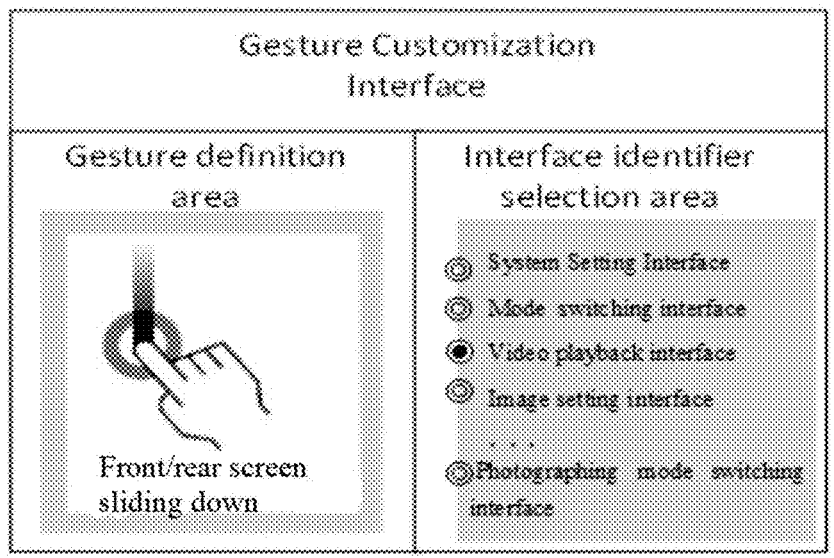

Exemplarily, as shown in FIG. 6b, the user sets the corresponding touch operation in the gesture definition area, for example, the set touch operation is one-finger sliding down, and selects the corresponding interface identifier in the interface identifier selection area, specifically the video playback interface. Of course, it is also possible to select the corresponding interface identifier in the interface identifier selection area, and then set the corresponding touch operation in the gesture definition area, and establish the correspondence between the two.

In an embodiment of the present disclosure, after applying the setting parameter to both the first touch screen and the second touch screen, the control method of the photographing device may further obtain a photographing instruction triggered by the user, and complete the photographing based on the setting parameter according to the photographing instruction.

In some embodiments, the setting parameter may include a screen control parameter, the screen control parameter being used to control the first touch screen and the second touch screen to display simultaneously when the first touch screen or the second touch screen displays the photographing interface, so as to facilitate viewing by different users.

In some embodiments, a photographing interface is displayed on the first touch screen or the second touch screen, wherein the photographing interface is used for displaying a preview image of the target to be shot; obtaining a photographing instruction triggered by the user based on the photographing interface, completing the photographing of the target to be shot in accordance with the photographing instruction, and obtaining a photographing image; and displaying the photographing image on the second touch screen or the first touch screen. This may facilitate that both the shooter or the person to be shot can view the image, and then shooting an image that makes both of them satisfied, thereby improving the user's experience.

Figure 7:
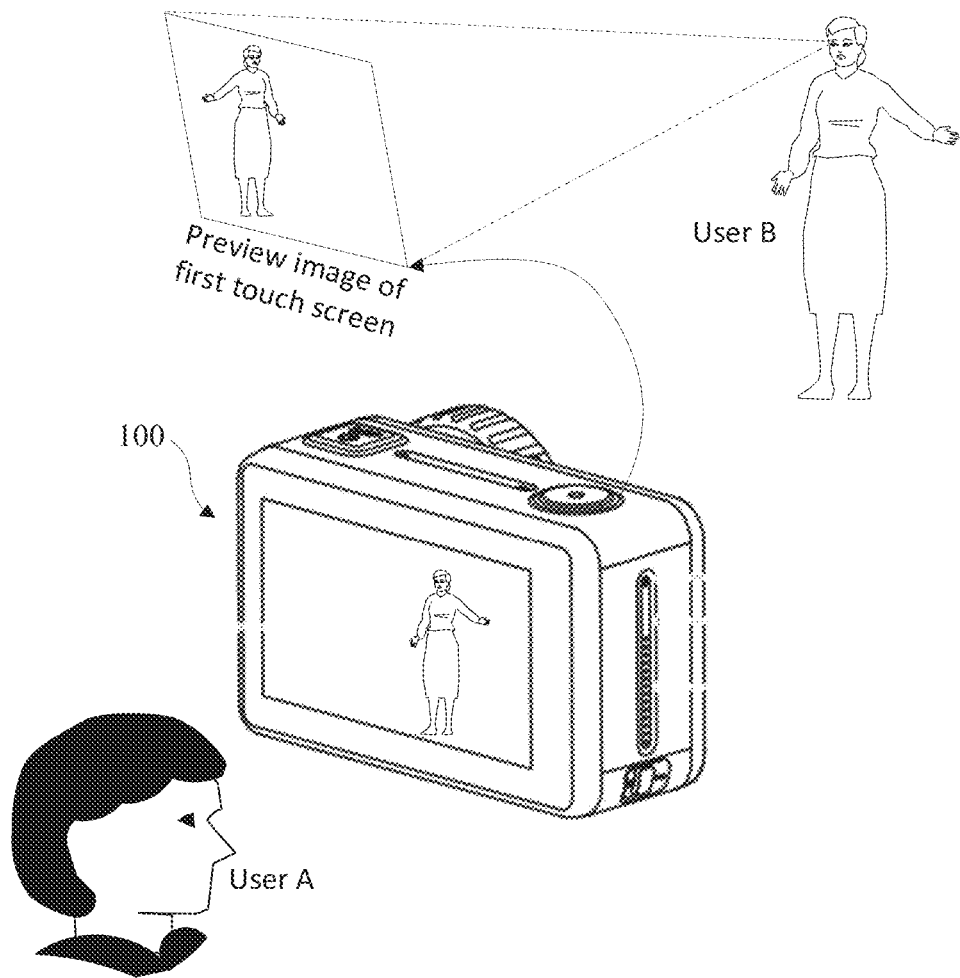
FIG. 7 is a schematic diagram of a photographing scene provided by some embodiments of the present disclosure.

Exemplarily, as shown in FIG. 7, when user A is using the photographing device, user A sets its corresponding setting parameter through the above control method and shoots a picture or video for user B based on the setting parameter. If the setting parameter includes a screen control parameter, when the first touch screen 12 or the second touch screen 13 displays the photographing interface, the first touch screen 12 and the second touch screen 13 are controlled to display simultaneously the photographing interface. For example, when the second touch screen 13 displays the photographing interface, the first touch screen 12 displays a preview image of the user B and a composition method of the preview image for the user B to confirm. After the user confirms, the user A starts photographing. As such, an image satisfactory to the person to be photographed can be captured. The user B's confirmation may be by language or a specific gesture informing the user A that he or she is satisfied with the current preview image.

It should be noted that the preview image may be composed in such a way that the image of user B is at the median location of the preview image, for example, at a position to the right of the preview image, but of course it may also be composed in other ways.

In some embodiments, the captured image further comprises information suggesting a composition of the target to be captured, so that the user can adjust the capture at any time according to the composition suggestion, thereby capturing a more perfect image.

The method of controlling a photographing device provided by some embodiments of the present disclosure allows a user to use the first touch screen 12 and/or the second touch screen 13 to set various functions or parameters, thereby realizing a more convenient and more intuitive human-computer interaction, and also completing all operations without switching the front and rear screens, thereby improving the user's operability and boundaries, and thereby improving the user's experience.

Figure 8:
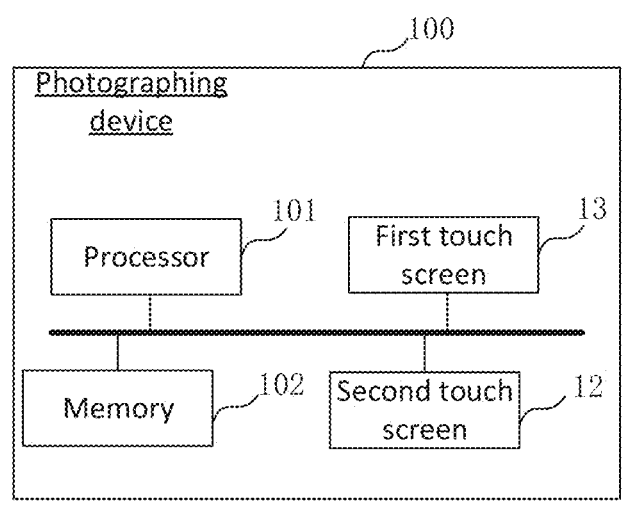
FIG. 8 is a schematic block diagram of a photographing device provided by some embodiments of the present disclosure.

Referring to FIG. 8, FIG. 8 is a schematic block diagram of a photographing device provided by an embodiment of the present disclosure. As shown in FIG. 8, the photographing device 100 includes a processor 101, a memory 102, a first touch screen 12 and a second touch screen 13, and the memory 102, the first touch screen 12, the second touch screen 13 are connected to the processor 101 via a bus, which is, for example, an I2C (Inter-integrated Circuit) bus.

Optionally, the processor 101 may be a micro-controller unit (MCU), a central processing unit (CPU), or a digital signal processor (DSP), among others.

Optionally, the memory 102 may be a Flash chip, a read-only memory (ROM, Read-Only Memory) disk, a CD-ROM, a USB flash drive, or a sliding hard drive, among others.

Optionally, the processor may be used to run a computer program stored in the memory and to implement, in executing the computer program, a method of controlling any one of the photographing devices provided by some embodiments of the present disclosure.

Exemplarily, the processor is used to run a computer program stored in memory and to implement the following steps in executing the computer program:

obtaining a setting operation of a user at the first touch screen or the second touch screen; displaying a first setting interface at the first touch screen and/or a second setting interface at the second touch screen based on the setting operation; obtaining a setting parameter set by a user based on the first setting interface or the second setting interface, and applying the setting parameter for both the first touch screen and the second touch screen.

In some embodiments, the first settings interface displays the same interface content as the second settings interface displays.

In some embodiments, the manner of displaying the interface content of the first settings interface is different from the manner of displaying the interface content of the second settings interface.

In some embodiments, the display method comprises one of a lattice display, a page-flip display, a full-screen display, a split-screen display, or a floating window display.

In some embodiments, the obtaining a setting parameter set by a user based on the first setting interface or second setting interface, applying the setting parameter for both the first touch screen and the second touch screen, comprises: obtaining a setting parameter set by a user based on the first setting interface or second setting interface;

Accordingly, displaying in the second setting interface or the first setting interface the setting process corresponding to the setting parameter and/or the corresponding setting parameter for confirmation by the user; and saving the setting parameter in both the first setting interface and the second setting interface according to the confirmation instruction of the user.

In some embodiments, the first setting interface and the second setting interface comprise a parameter confirmation icon; the processor is used to: obtain a user's confirmation operation of the parameter confirmation icon, and obtain the user's confirmation instruction.

In some embodiments, the processor is used for: obtaining an operation of the user on the first touch screen or the second touch screen, and determining to obtain an confirmation instruction from the user if the user's operation is a predetermined confirmation operation.

In some embodiments, the first setting interface and the second setting interface comprise a plurality of setting icons, different setting icons being used to set different setting parameters.

In some embodiments, the size of the first touch screen is smaller than the size of the second touch screen, and the first touch screen displays the setting icons of the setting interfaces by flipping pages.

In some embodiments, the setting operation comprises a plurality of different touch operations, the plurality of different touch operations corresponding to different setting interfaces respectively.

In some embodiments, the touch operations comprise at least one of: single-finger sliding down, single-finger sliding up, single-finger sliding right, single-finger sliding left, single-finger sliding up and down, single-finger long press, two-finger double tap, and two-finger sliding left and right.

In some embodiments, the setting interfaces includes at least one of: a system setting interface, a mode parameter switching interface, a video playback interface, an image setting interface, a brightness adjustment interface, a metering mode interface, a front and rear screen switching interface, or a photographing mode switching interface.

In some embodiments, the mode parameter switching interface includes a mode switching interface and a parameter switching interface under the mode switching interface; wherein the mode switching interface includes at least one of a photo taking mode, a video photographing mode, and a slow motion mode, and the parameter switching interface includes at least one of a resolution or a frame rate.

In some embodiments, single finger sliding down corresponds to the system setting interface; and/or, single finger sliding up corresponds to the mode parameter switching interface; and/or, single finger sliding right corresponds to the video playback interface; and/or, single finger sliding left corresponds to the image setting interface; and/or, single finger sliding up and down corresponds to the brightness adjusting interface; and/or, single finger long press corresponds to the metering mode interface; and/or, two-finger double-tapping corresponds to the front and rear screen switching interface; and/or, two-finger sliding left and right corresponds to the photographing mode switching interface.

In some embodiments, the processor is used to: obtain a user-defined touch operation and a setting interface selected by the user for the customized touch operation; and establish and save an association between the customized touch operation and the selected setting interface.

In some embodiments, the processor is used to: display a gesture customization interface for a user to customize a touch operation and to select an interface identifier for the setting interface, wherein the gesture customization interface comprises a gesture definition area and a plurality of interface identifiers for the setting interfaces for selection.

In some embodiments, the method further comprises, after the applying the setting parameters for both the first touch screen and the second touch screen:

obtaining a photographing instruction triggered by a user, completing photographing based on the setting parameters in accordance with the photographing instruction.

In some embodiments, the setting parameter comprises a screen control parameter, the screen control parameter being used to control the simultaneous display of the first touch screen and the second touch screen when the first touch screen or the second touch screen displays a photographing interface.

In some embodiments, the processor is used for: displaying the photographing interface on the first touch screen or the second touch screen, the photographing interface being used for displaying a preview image of a target to be shot; obtaining a photographing instruction triggered by a user based on the photographing interface, and completing photographing of the target to be shot according to the photographing instruction to obtain a photographing image; and accordingly displaying the photographing image on the second touch screen or said first touch screen.

In some embodiments, the captured image further includes information suggesting a composition of the target to be captured.

Some embodiments of the present disclosure also provide a non-transitory computer-readable storage medium, the computer-readable storage medium storing a computer program, the computer program comprising program instructions, the processor executing the program instructions to realize the steps of the method of controlling a photographing device described in any one of the above embodiments provided.

The computer-readable storage medium may be an internal storage unit of the photographing device as described in any of the preceding embodiments, such as the memory or RAM of the photographing device. The computer-readable storage medium may also be an external storage device of the photographing device, such as a plug-in hard disk equipped on the photographing device, a Smart Media Card (SMC), a Secure Digital (SD) card, a Flash Card, and the like.

The foregoing is only a specific embodiment of the present disclosure, but the scope of protection of the present disclosure is not limited thereto, and any person skilled in the art can easily think of various equivalent modifications or substitutions within the scope of the technology disclosed in the present disclosure, which shall be covered by the scope of protection of the present disclosure. Therefore, the scope of protection of this application shall be subject to the scope of protection of the claims.

What is claimed is:

1. A method of controlling a photographing device, comprising:
    displaying a photographing interface on a first touch screen of a photographing device, the photographing interface displaying a preview image of a target to be shot;
    obtaining a setting operation from a user on a second touch screen of the photographing device, the first touch screen being on a first side of the photographing device where a lens is disposed, and the second touch screen being on a second side of the photographing device opposite to the first side of the photographing device;
    displaying a setting interface on the second touch screen in accordance with the setting operation; and
    in response to an adjustment operation from the user on the setting interface to adjust a photographing parameter to obtain an adjusted photographing parameter, applying the adjusted photographing parameter to the photographing interface displayed on the first touch screen, to adjust a display effect of the preview image based on the adjusted photographing parameter.

2. The method according to claim 1,
wherein the setting interface is a first setting interface, the method further comprising:
    displaying a second setting interface on the first touch screen, the first setting interface displaying same interface content as the second setting interface.

3. The method according to claim 1,
wherein the setting interface is a first setting interface, the method further comprising:
    displaying a second setting interface on the first touch screen, a display mode of interface content of the first setting interface being different from a display mode of interface content of the second setting interface.

4. The method according to claim 3, wherein the display mode comprises one of: a lattice display, a page-flipping display, a full-screen display, a split-screen display, or a floating window display.

5. The method according to claim 1,
wherein the setting interface is a first setting interface, the method further comprising:
    obtaining the adjusted photographing parameter by the user on the first setting interface;
    displaying a setting process corresponding to the adjusted photographing parameter and/or the adjusted photographing parameter for confirmation by the user in a second setting interface on the first touch screen; and
    saving the adjusted photographing parameter in both the first setting interface and the second setting interface according to a confirmation instruction by the user.

6. The method according to claim 1,
wherein the setting interface includes a parameter confirmation icon;
the method further comprising:
    obtaining a confirmation operation on the parameter confirmation icon to obtain a confirmation instruction by the user.

7. The method according to claim 1, further comprising:
    obtaining an operation of the user on the first touch screen or the second touch screen;
    determining that the operation of the user is a predetermined confirmation operation; and
    obtaining a confirmation instruction from the user.

8. The method according to claim 1, wherein the setting interface includes a plurality of setting icons, and the plurality of setting icons are configured to set different photographing parameters.

9. The method according to claim 1,
wherein the setting interface is a first setting interface, the method further comprising:
    displaying a second setting interface on the first touch screen, wherein a size of the first touch screen is smaller than a size of the second touch screen, and the first touch screen displays setting icons of the second setting interface by means of page-flipping.

10. The method according to claim 1, wherein the setting operation comprises a plurality of different touch operations, the plurality of different touch operations corresponding to different setting interfaces respectively.

11. The method according to claim 10, wherein the setting interface includes at least one of a system setting interface, a mode parameter switching interface, a video playback interface, an image setting interface, a brightness adjustment interface, a metering mode interface, a front and rear screen switching interface, or a photographing mode switching interface.

12. The method according to claim 1,
wherein the setting interface is one of a plurality of setting interfaces,
the method further comprising:
obtaining a customized touch operation and one of the plurality of setting interfaces selected by the user for the customized touch operation; and
establishing and saving an association of the customized touch operation with the selected one of the plurality of settings interfaces.

13. The method according to claim 12, further comprising:
displaying a gesture customization interface for the user to customize a touch operation and select an interface identifier of the one of the plurality of setting interfaces,
wherein the gesture customization interface comprises a gesture definition area and a plurality of interface identifiers of the one of the plurality of setting interfaces for selection.

14. The method according to claim 1, further comprising, after applying the adjusted photographing parameter to the photographing interface displayed on the first touch screen and the second touch screen:
obtaining a photographing instruction triggered by the user, and
completing photographing based on the adjusted photographing parameter in accordance with the photographing instruction.

15. The method according to claim 1, further comprising simultaneous displaying the photographing interface on the first touch screen and the second touch screen.

16. The method according to claim 1, further comprising:
obtaining a photographing instruction triggered by the user based on the photographing interface;
completing photographing of the target to be shot according to the photographing instruction to obtain a photographing image; and
displaying the photographing image on the second touch screen or the first touch screen.

17. The method according to claim 1, wherein:
displaying the photographing interface on the first touch screen includes displaying the photographing interface on the first touch screen and the second touch screen; and
applying the adjusted photographing parameter to the photographing interface displayed on the first touch screen includes applying the adjusted photographing parameter to the photographing interface displayed on the first touch screen and the second touch screen.

18. The method according to claim 1, wherein the photographing parameter includes a resolution or a frame rate.

19. A photographing device, comprising a processor and a memory;
the memory stores a computer program;
the processor is configured to, in executing the computer program:
control to display a photographing interface on a first touch screen of a photographing device, the photographing interface displaying a preview image of a target to be shot;
obtain a setting operation from a user on a second touch screen of the photographing device, the first touch screen being on a first side of the photographing device where a lens is disposed, and the second touch screen being on a second side of the photographing device opposite side of to the first side of the photographing device;
display a setting interface on the second touch screen in accordance with the setting operation; and
in response to an adjustment operation from the user on the setting interface to adjust a photographing parameter to obtain an adjusted photographing parameter, apply the adjusted photographing parameter to the photographing interface displayed on the first touch screen, to adjust a display effect of the preview image based on the adjusted photographing parameter.

20. A method of controlling a photographing device, comprising:
obtaining a setting operation from a user on a first touch screen or a second touch screen of a photographing device, the first touch screen being on a first side of the photographing device where a lens is disposed and a second touch screen being on a second side of the photographing device opposite to the first side of the photographing device;
displaying a first setting interface on the first touch screen and/or displaying a second setting interface on the second touch screen in accordance with the setting operation;
obtaining a setting parameter set by the user based on the first setting interface or the second setting interface;
applying the setting parameter to both the first touch screen and the second touch screen;
obtaining a customized touch operation and a setting interface selected by the user for the customized touch operation;
establishing and saving an association of the customized touch operation with the selected settings interface; and
displaying a gesture customization interface for the user to customize a touch operation and select an interface identifier of the setting interface;
wherein the gesture customization interface comprises a gesture definition area and a plurality of interface identifiers of setting interfaces for selection.

* * * * *